United States Patent
Leschke et al.

[11] Patent Number: 6,086,137
[45] Date of Patent: Jul. 11, 2000

[54] SIDE DOOR OF A PASSENGER VEHICLE

[75] Inventors: Harald Leschke, Sindelfingen; Uwe Haller, Eisingen, both of Germany; Franco Cerva, Moncalieso; Luigi Caprioglio, c./Torino, both of Italy

[73] Assignee: DaimlerChrysler AG, Stuttgart, Germany

[21] Appl. No.: 08/939,650

[22] Filed: Sep. 29, 1997

[30] Foreign Application Priority Data

Sep. 27, 1996 [DE] Germany .......................... 196 39 663

[51] Int. Cl.$^7$ ...................................... B60J 1/08
[52] U.S. Cl. ................... 296/146.1; 296/146.11; 296/202
[58] Field of Search ................ 296/146.1, 146.11, 296/146.12, 202, 190.11; 49/209, 226, 240, 385, 333, 150, 153, 154

[56] References Cited

U.S. PATENT DOCUMENTS 3,589,069  6/1971  Lecomte .................... 296/146.11 X

FOREIGN PATENT DOCUMENTS

| | | |
|---|---|---|
| 0493225A1 | 7/1992 | European Pat. Off. . |
| 2380911 | 9/1978 | France ................ 296/146.11 |
| 2 694 244 | 2/1994 | France . |
| 43 19 662 A1 | 12/1994 | Germany . |
| 4319662 A1 | 12/1994 | Germany ............ 296/146.11 |
| 59-75880 | 5/1984 | Japan . |
| 59-202930 | 11/1984 | Japan . |
| 63-63878 | 3/1988 | Japan . |
| 2-128779 | 10/1990 | Japan . |
| 6-24245 | 2/1994 | Japan . |
| Search Report | 12/1997 | United Kingdom . |

*Primary Examiner*—D. Glenn Dayoan
*Assistant Examiner*—Lori L. Coletta
*Attorney, Agent, or Firm*—Evenson, McKeown, Edwards & Lenahan, P.L.L.C.

[57] ABSTRACT

The invention relates to a side door of a passenger vehicle, which for opening purposes, following a sideways movement which moves the side door out of the door aperture, is actuated by auxiliary forces to pivot forwards and upwards around a horizontally aligned, bodywork-mounted bearing point, and it is proposed, in order to provide quick release from the A-pillar and to create the preconditions for a conveniently operating movement mechanism with expedient accommodation for the latter, that in the horizontal plane, in relation to the transverse direction of the vehicle, the pivot axis of the bearing point respectively runs at an angle, which does not exceed for example 25° in each case, in the anticlockwise direction on the left-hand side and in the clockwise direction on the right-hand side.

22 Claims, 3 Drawing Sheets

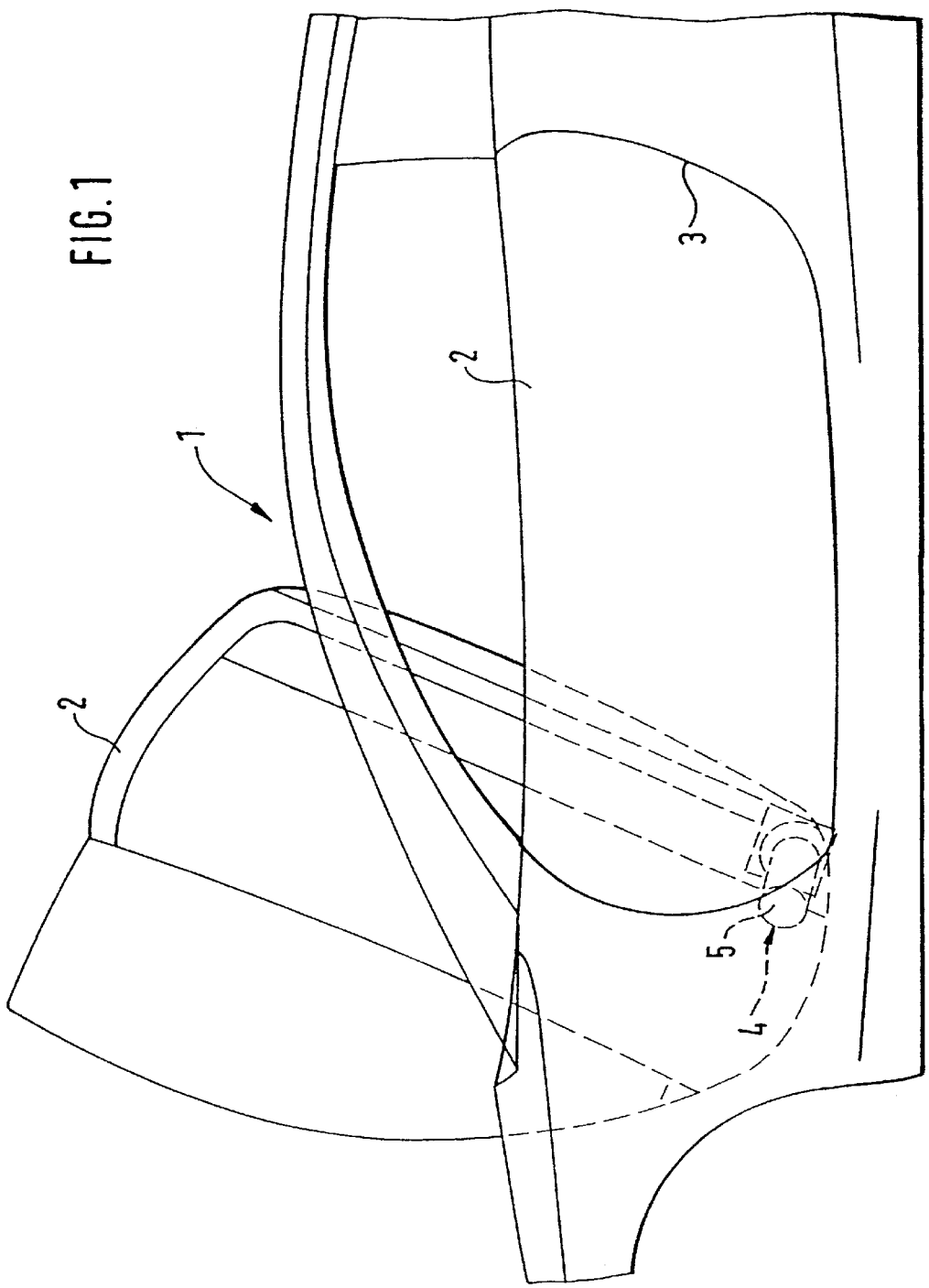

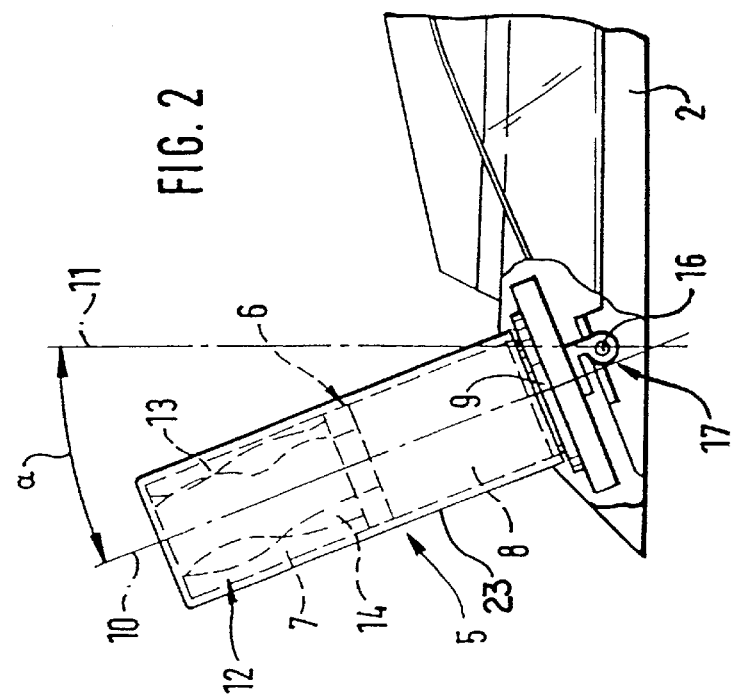
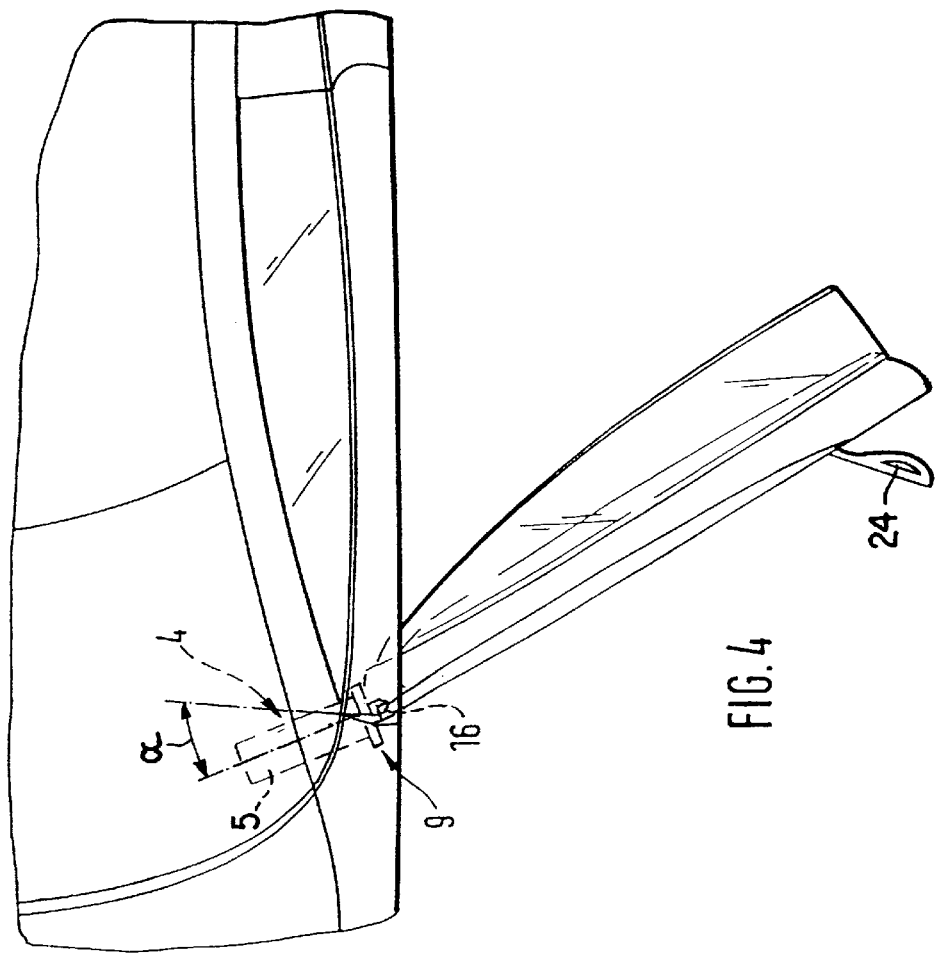

SIDE DOOR OF A PASSENGER VEHICLE

BACKGROUND AND SUMMARY OF THE INVENTION

This application claims the priority of German application 196 39 663.8-21 filed in Germany on Sep. 27, 1996, the disclosure of which is expressly incorporated by reference herein.

The invention relates to a side door of a passenger vehicle, which for opening purposes, following a sideways movement which moves the side door out of the door frame, is actuated by auxiliary forces to pivot forwards and upwards around a horizontally aligned, bodywork-mounted bearing point.

A door movement of this type is known from German Patent Document DE 43 19 662 A1 and is particularly expedient in two-door vehicles where the doors are long and, for opening purposes, require a large amount of space to allow passengers to get in and out of the vehicle easily, this space not always being available, for example when vehicles are parked one beside the other. In the case of the known door-control means, which is intended in particular for a subsequent installation, the sideways movement in the transverse direction of the vehicle is executed by means of a linear guide which is accommodated in the door aperture on the A-pillar side.

An object of the invention is to arrange the movement mechanism in a non-disruptive manner and such that, when the side door opens sideways, it is released as quickly as possible from the A-pillar, so as not to be subject to any stylistic constraints there, and such that the preconditions for using a movement mechanism which permits a movement sequence which can be easily executed are created.

This object is achieved by providing a side door arranged wherein in the horizontal plane, the pivot axis of the bearing point respectively extends at an angle in relation to the transverse direction of the vehicle, which angle does not exceed 25° in each case, which angle is in the anticlockwise direction on a left-hand side and in the clockwise direction on a right-hand side.

An automatically proceeding movement operation of the side door, in which case the triggering command may be, for example, transmitter-controlled, is made possible if the sideways movement of the side door is also executed by auxiliary force and the mechanism which produces the movement sequence comprises a type of piston/cylinder unit, of which the piston is equipped with guide elements which—in relation to the opening operation of the side door—bring about an axial movement and a subsequent pivot movement.

In a preferred exemplary embodiment of the invention, the bearing point contains a hinge, of which the bearing journal, in normal operation, connects the two hinge halves rigidly to one another and, in order to bring about an emergency pivoting-out actuation of the side door, can be moved into a starting position, in which the two hinge halves can be pivoted with respect to one another.

If the locking function is eliminated by the actuation of a handle which is accessible from inside and outside the door and is secured against unintentional actuation, it is possible, for example in the case of accident-induced failure of the opening operation which is actuated by auxiliary forces, for the side door to be pivoted open to the side and also for a, for example, unconscious passenger to be easily rescued.

Other objects, advantages and novel features of the present invention will become apparent from the following detailed description of the invention when considered in conjunction with the accompanying drawings.

BRIEF DESCRIPTION OF THE DRAWINGS

FIG. 1 schematically illustrates a two-door vehicle with the passenger door pivoted up, constructed according to a preferred embodiment of the present invention;

FIG. 2 shows a first embodiment, which is represented in simplified form, of a mechanism which produces the door movement sequence in the vehicle depicted in FIG. 1.

FIG. 4 schematically illustrates the vehicle of FIG. 1 with a side door which is pivoted open by using an emergency-actuation means constructed in accordance with preferred embodiments of the present invention, FIG. 5 schematically illustrates a first embodiment for bringing about hinge action for initiating emergency actuation, involving displacement of the bearing journal, and FIG. 6 schematically illustrates a second embodiment for bringing about hinge action for initiating emergency actuation involving eliminating the blocking function of a pin.

DETAILED DESCRIPTION OF THE DRAWINGS

Figure 3:
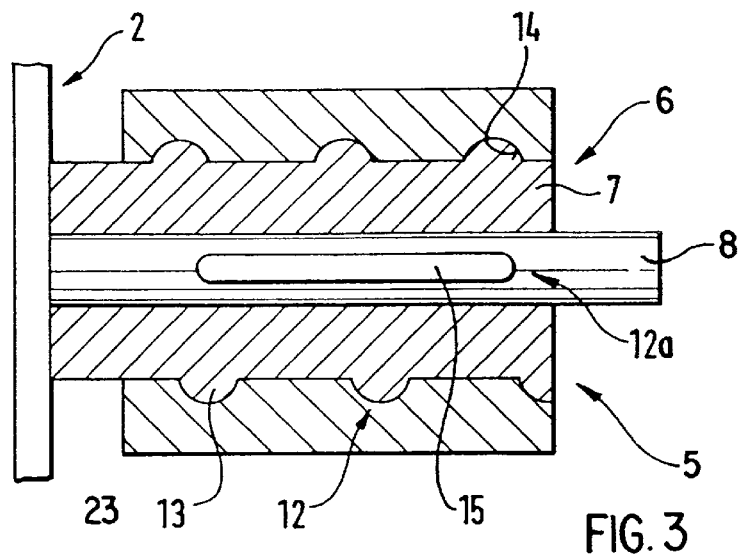
FIG. 3 is an enlarged schematic view of an exemplary embodiment of the mechanism for producing the door movement sequence of the system of FIGS. 1 and 2.

A passenger vehicle 1, which is illustrated in simplified form according to FIG. 1, is provided with two side doors 2, showing the passenger door pivoted up to allow passengers to get in and out of the vehicle. During opening, the side door 2 is moved to the side first of all, so that it can be released from the door aperture 3, and only then is pivoted up, in a manner described more fully herein. This movement sequence is brought about by a mechanism 4, which constitutes a type of piston/cylinder unit 5.

This piston/cylinder unit 5 is equipped with a piston 6 which, according to FIGS. 2 and 3, comprises two piston sections 7 and 8 which can be displaced relative to one another by any known type of displacing apparatus, such as a pressurized medium or a mechanical drive. As is also shown in FIG. 2, the mechanism 4 is provided with a bearing point 9 for the side door 2. The pivot axis 10 of the bearing point 9 extends in the horizontal plane at an angle α in the anticlockwise direction with respect to a transverse direction 11 of the vehicle for the left-hand side door 2. This angle α is preferably 25° or less, which means that, when this side door 2 moves sideways, it is released very quickly from the A-pillar which accommodates the mechanism 4. The right-hand pivot axis extends in a mirror-reflected manner, with the result that the extensions of the two axes would intersect at the footwell in front of the passenger seats.

According to FIG. 2, sideways movement of the door is brought about in that, in a manner which is not illustrated in any more detail, first of all the front piston section 8 is actuated, this piston section 8 being guided over its displacement length in a manner secured against rotation. Once the piston section 8 has reached its end position, then the rear piston section 7 is actuated, which, as indicated, has on its outer surface guide elements 12 in the form of a screw-thread turn 13, which is in angled connection with an associated screw-thread turn 14 in the stationary cylinder 23. As a result, the piston section 7, which is connected to the side door 2 in a rotationally fixed manner, is forced to execute a pivot movement, which coincides with a lifting movement, this allowing the side door 2 to be pivoted upwards as depicted in FIG. 1.

In the exemplary embodiment according to FIG. 3, the two piston sections 7 and 8 are arranged coaxially with respect to one another, and in order to bring about an opening movement, first of all the piston section 8, which is secured against rotation by the guide element 12a in the form of an adjusting spring 15, is moved to the left and only then is the piston section 7 force-actuated, whereupon said piston section 7, executing a screw-type movement, pivots the side door 2 upwards.

Figure 5:
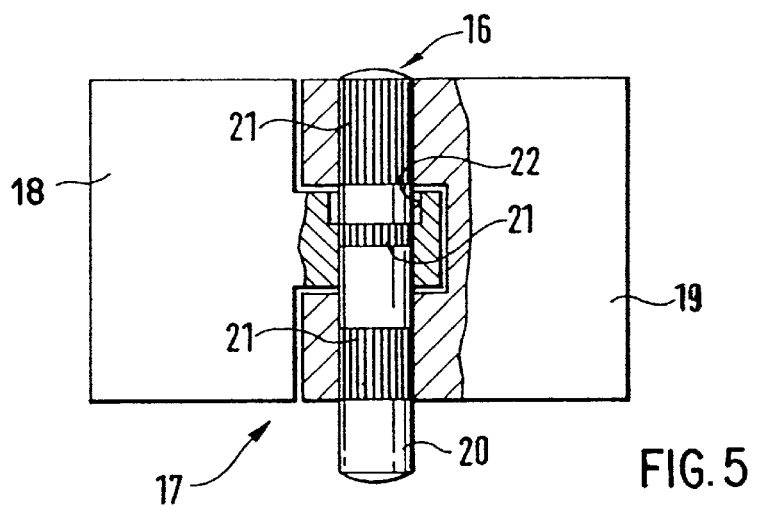
Figure 6:
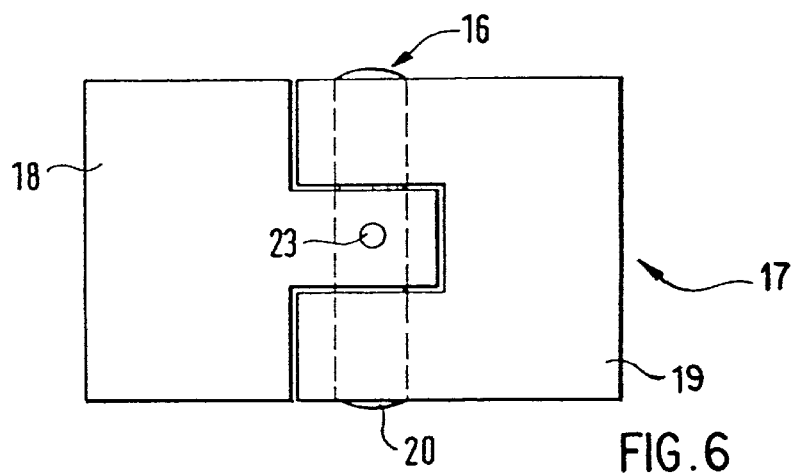

According to FIGS. 2 and 4, the bearing point 9 comprises a pivot axis 16 around which, in order to bring about an emergency actuation of the side door 2, the latter can be pivoted outwards in the conventional manner, as is shown in FIG. 4. The bearing point 9 is assigned a hinge 17, which is illustrated in FIGS. 5 and 6 and can also be seen from FIG. 2. In the exemplary embodiment according to FIGS. 5 and 6, the two hinge halves 18 and 19 are connected by means of a bearing journal 20 which, in normal operation, connects the two hinge halves 18 and 19 fixedly to one another. In order to achieve this, the bearing journal 20 according to FIG. 5 is provided with polygonal sections 21, e.g. in the form of a toothed shaft, which enter into a form fit, and thus a force fit, with the hinge halves 18 and 19. The central polygonal section 21 is followed, as seen towards the top in the illustration, by a cutout 22 into which, with a specifically executed upward movement of the bearing journal 20, the central polygonal section 21 passes, as a result of which the blocking action with the hinge half 18 is eliminated and a hinge action takes place.

In the exemplary embodiment according to FIG. 6, the hinge action is brought about in that a pin 23 which connects the bearing journal 20 to the hinge half 18 is forced out. The two described measures for bringing about the hinge function if required, for example if the pivot actuation fails as a result of an accident, can be effected by a handle 24 fitted on the inside and outside of the door, only the handle on the outside of the door being indicated in FIG. 4. Pulling on the handle 24, which is secured against unintentional actuation, can trigger an auxiliary-force function, by means of which, in FIG. 5, the bearing journal 20 is displaced by a predetermined amount in the direction of the cutout 22 or, in FIG. 6, the pin 23 is forced out of the bearing journal 20.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Side door of a passenger vehicle, which for opening purposes, following a sideways movement which moves the side door out of a door aperture, is actuated by auxiliary forces to pivot forwards and upwards around a horizontally aligned, bodywork-mounted bearing point, wherein in a horizontal plane, a pivot axis of the bearing point extends at an angle in relation to a transverse direction of the vehicle, wherein the angle does not exceed 25° and is in an anticlockwise direction on a left-hand side of the vehicle and in a clockwise direction on a right-hand side of the vehicle, wherein the sideways movement of the side door is executed by auxiliary force and a mechanism which produces a movement sequence comprises a type of piston/cylinder unit, wherein a piston is equipped with guide elements which bring about an axial movement and a subsequent pivot movement in relation to the opening of the side door.

2. Side door according to claim 1, wherein the piston/cylinder unit comprises two piston sections which can be displaced relative to one another and wherein, when actuated, one piston section executes a displacement motion necessary for the sideways movement, and the other piston section has a guide element formed as at least one screw-thread turn on an outer surface, which screw thread turn engages with an associated screw-thread turn of a stationary cylinder, wherein when the other piston section, which is connected to the side door in a rotationally fixed manner is actuated, the side door is forced to execute a pivot movement.

3. Side door according to claim 2, wherein the two piston sections are arranged one behind the other.

4. Side door according to claim 2, wherein the two piston sections are arranged coaxially with respect to one another.

5. Side door according to claim 3, wherein the two piston sections are arranged coaxially with respect to one another.

6. Side door according to claim 2, wherein the piston sections are displaced by a pressurized medium.

7. Side door according to claim 5, wherein the piston sections are displaced by a pressurized medium.

8. Side door according to claim 2, wherein the piston sections are displaced by a mechanical drive.

9. Side door according to claim 5, wherein the piston sections are displaced by a mechanical drive.

10. Side door according to claim 1, wherein the bearing point contains a hinge formed by two hinge halves and a bearing journal, which, in normal operation, connects the two hinge halves rigidly to one another and, in order to bring about an emergency pivoting-out actuation of the side door, can be moved into a starting position, in which the two hinge halves can be pivoted with respect to one another.

11. Side door according to claim 2, wherein the bearing point contains a hinge formed by two hinge halves and a bearing journal which, in normal operation, connects the two hinge halves rigidly to one another and, in order to bring about an emergency pivoting-out actuation of the side door, can be moved into a starting position, in which the two hinge halves can be pivoted with respect to one another.

12. Side door according to claim 5, wherein the bearing point contains a hinge formed by two hinge halves and a bearing journal which, in normal operation, connects the two hinge halves rigidly to one another and, in order to bring about an emergency pivoting-out actuation of the side door, can be moved into a starting position, in which the two hinge halves can be pivoted with respect to one another.

13. Side door according to claim 10, wherein the bearing journal has at least one central polygonal, toothed section which loses a locking function when the bearing journal moves axially.

14. Side door according to claim 12, wherein the bearing has at least one central polygonal, toothed section which loses a locking function when the bearing journal moves axially.

15. Side door according to claim 10, wherein the bearing journal is pinned with respect to the hinge part which is to be blocked with a removeable pin.

16. Side door according to claim 12, wherein the bearing journal has at least one central polygonal, toothed section which loses a locking function when the bearing journal moves axially.

17. Side door according to claim 10, wherein the locking function is eliminated by actuation of a handle which is accessible from inside and outside the door and is secured against unintentional actuation.

18. Side door according to claim 12, wherein the locking function is eliminated by actuation of a handle which is accessible from inside and outside the door and is secured against unintentional actuation.

19. Side door according to claim 17, wherein an energy store which triggers an unlocking action is set in operation when a handle is actuated.

20. A passenger vehicle side door assembly comprising:
   a side door which in use selectively closes a passenger ingress an egress opening in a passenger vehicle, and
   an opening mechanism operable to first move the door sideways out of the opening and to subsequently pivot the door about a pivot axis extending transversely of the door to a position where the door opening is accessible for passenger ingress and egress,
   said pivot axis extending at an acute angle with respect to a transverse direction of the vehicle, wherein said opening mechanism includes a piston-cylinder unit comprising two piston sections which can be displaced relative to one another, one of said piston sections executing displacement for the sideways movement and the other piston section having, on an outer surface thereof, a guide element in a form of at least one screw thread turn on, which screw thread turn engages with an associated screw thread turn of a stationary cylinder, whereby, when the other piston section connected to the side door in a rotationally fixed manner is actuated, the side door is forced to execute a pivot movement.

21. A side door assembly according to claim 20, wherein said acute angle is less than 25°.

22. A side door assembly according to claim 21, wherein said opening mechanism includes a bearing point which defines the pivot axis, and
   wherein the bearing point contains a hinge with a bearing journal connecting the two hinge halves rigidly to one another in normal operations, and
   wherein, in order to bring about an emergency pivoting out action of the side door about a vertical pivot axis, said two hinge halves can be selectively disposed to be pivoted with respect to one another.

* * * * *